United States Patent [19]

Harris

[11] 4,025,327

[45] May 24, 1977

[54] METHOD FOR FABRICATING A MASS SPECTROMETER INLET LEAK

[75] Inventor: Robert F. Harris, Annapolis, Md.

[73] Assignee: The United States of America as represented by the Administrator of the National Aeronautics and Space Administration, Washington, D.C.

[22] Filed: Nov. 26, 1975

[21] Appl. No.: 635,519

[52] U.S. Cl. .................................. 65/54; 65/59 A; 65/64; 65/108

[51] Int. Cl.² .................. C03B 23/08; C03C 27/02

[58] Field of Search ............... 65/54, 59 A, 64, 108

[56] References Cited

UNITED STATES PATENTS

| 3,393,988 | 7/1968 | Blumenthal ................. 65/108 X |
| 3,632,325 | 1/1971 | Evey et al. ................ 65/59 A X |
| 3,652,248 | 3/1972 | Loxley et al. ................. 65/108 |

Primary Examiner—Arthur O. Kellogg
Attorney, Agent, or Firm—Robert D. Marchant; John O. Tresansky; John R. Manning

[57] ABSTRACT

A method of fabricating an inlet leak for measuring chemically reactive gases. The method involves the steps of preparing a selected internal surface of a high melting point metal tubing for sealing to a glass tubing; inserting a portion of the glass tubing into the prepared portion of the metal tubing, the glass tubing having an outer diameter substantially the same as the inner diameter of the metal tubing; sealing the inserted glass tubing to the internal surface of the metal tubing; drawing the glass tubing under a magnifying device to reduce the entire interior diameter thereof to substantially two microns; and breaking away an end portion of the drawn glass tubing.

14 Claims, 6 Drawing Figures

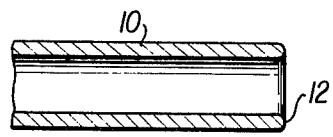
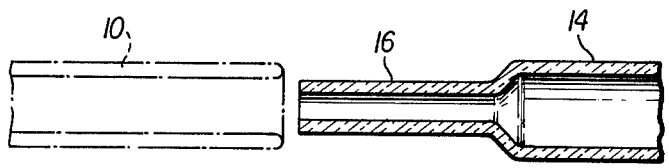
FIG.1
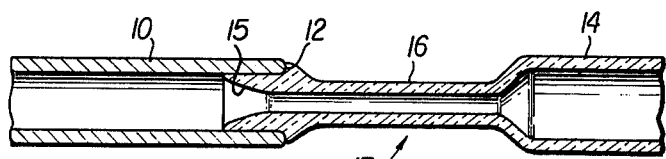
FIG.2
FIG.3
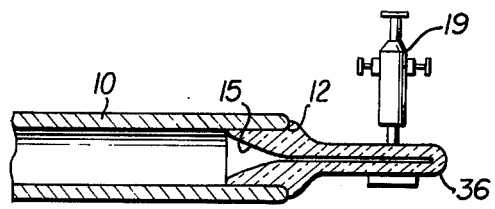
FIG.4
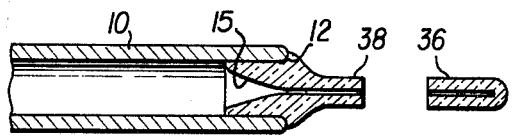
FIG.5
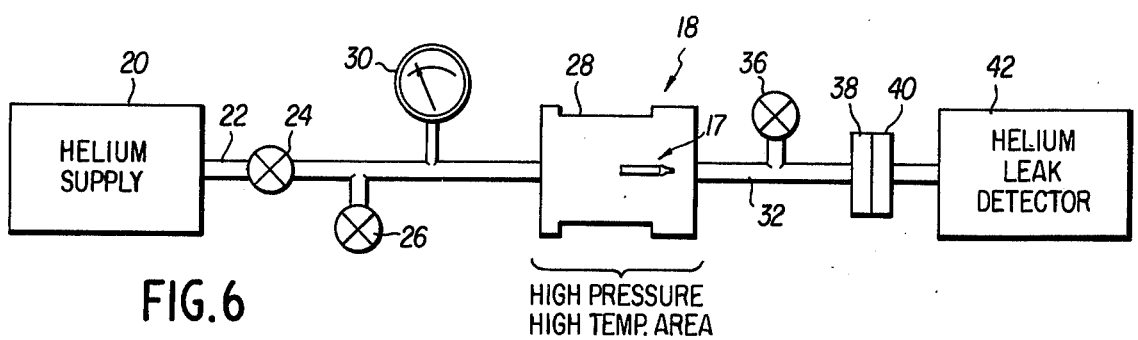
FIG.6  HIGH PRESSURE HIGH TEMP. AREA

4,025,327

METHOD FOR FABRICATING A MASS SPECTROMETER INLET LEAK

ORIGIN OF THE INVENTION

The invention described herein was made by an employee of the United States Government and may be manufactured and used by or for the Government for Governmental purposes without the payment of any royalties therein or therefor.

BACKGROUND OF THE INVENTION

1. Field of the Invention:

The present invention relates generally to inlet leaks for mass spectrometers, and more particularly to a method of fabricating an inlet leak for use in high pressure, hostile environments.

2. Description of the Prior Art:

A number of circumstances exist in which it is necessary to provide a highly reliable inlet leak for a mass spectrometer in high pressure, highly hostile environments. Circumstances of this type exist, for example, in the field of interplanetary explorations. In particular, studies conducted on the planet Venus require inlet leaks capable of withstanding intense pressures, high temperatures, and a highly corrosive atmosphere. Other less dramatic uses for similar inlet leaks exist in numerous industrial processes wherein similar high pressure, high temperature corrosive atmospheres exist.

Previously available inlet leaks have proven unsatisfactory for use in the types of hostile environments described above. For example, conventional sintered ceramic leaks are unreliable in such environments since they can substantially modify gas constituents being measured due to gas being adsorbed on the walls of the porous ceramic material. The adsorbed species would then outgas at later times, causing substantial sample distortions. Similarly, the small openings in the porous ceramic material are susceptible to blockage, which can result in a loss of calibration of the spectrometer instrument. It is, of course, extremely important to eliminate these problems, particularly in the field of interplanetary exploration, where probes cannot be serviced and where instruments produced and flown at great expense may be caused to fail or provide inaccurate results simply because of errors produced by inlet leaks.

Similarly, conventional low temperature glass leaks cannot be used in the types of environments mentioned above, particularly where temperatures are expected to range above 475° C.

Prior known gas sampling probes made of ceramic materials are disclosed in U.S. Patents such as U.S. Pat. No. 3,559,491 to Thoen, issued Feb. 2, 1971. Similarly, a conventional inlet leak formed between the intersection of two conventional glass members is disclosed in U.S. Pat. No. 3,423,304, to Leonard, issued Jan. 21, 1969. These prior art techniques exemplify some of the shortcomings in the prior art pointed out above.

SUMMARY OF THE INVENTION

Accordingly, one object of this invention is to provide a novel method of fabricating an inlet leak structure adapted for use with a mass spectrometer.

Another object of the present invention is the provision of a novel a method of fabricating an inlet leak structure which is particularly suited to use in high pressure, hostile environments.

Yet another object of the present invention is the provision of a novel a method of fabricating an inlet leak structure adapted for use with a mass spectrometer and particularly designed for reliable use in high pressure, high temperature environments.

Yet another object of the present invention is the provision of a novel method of constructing an inlet leak adapted for use with a mass spectrometer.

A still further object of the present invention is the provision of a novel method for constructing an inlet leak suitable for use in high pressure, high temperature environments.

Briefly, these and other objects of the present invention are attained by sealing a length of borosilicate glass tubing to a metal tube, preferably constructed of Kovar, having a particularly high melting point. The borosilicate glass tubing is drawn to provide a leak aperture having a diameter no less than two microns.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross sectional illustration of a length of metal tubing showing the rounded ends thereof;

FIG. 2 is a cross sectional illustration of a length of glass tubing showing a reduced neck portion;

FIG. 3 is a cross sectional illustration of a bond formed between the metal tubing and glass tubing illustrated in FIGS. 1 and 2;

FIG. 4 is a cross sectional illustration of a drawn and sealed leak assembly;

FIG. 5 is a cross sectional illustration of a finished leak after removal of the sealed tip illustrated in FIG. 4; and, FIG. 6 is a schematic illustration of a leak testing apparatus.

DESCRIPTION OF THE PREFERRED EMBODIMENTS

As mentioned previously, one reason why previously known leak structures were considered unsuitable for use in hostile environments of the types described above was based upon the materials of which these previously known leaks were constructed. Accordingly, it is of considerable importance that a leak structure to be used in high temperature, high pressure hostile environments be constructed of materials which would not be adversely effected by such environmental conditions. Accordingly, after a thorough study of potential materials, Kovar metal tubing being composed of substantially 54% Fe, 29% Ni, and 17% Co, was selected as the base upon which the leak nozzle was to be constructed. As is well known, Kovar is a highly stable, corrosion resistant alloy having a very high melting point. Considerable study was also directed to the selection of a suitable glass composition from which to form the leak inlet. A number of compositions were considered, with the eventual selection of borosilicate glass, as processing the desirable properties of a high melting point, a resistance to absorption of gas molecules, and generally stable compositional characteristics. In particular, it was found that the borosilicate glass composition No. 7056 having a composition of substantially 70% $SiO_2$, 3% $Al_2O_3$, 17% $B_2O_3$, 1% $Li_2O$, 1% $Na_2O$, and 8% $K_2O$ and produced by the Corning Glassworks was most suitable for forming a leak inlet.

Once the appropriate materials for the leak were selected, it was necessary to develop an adequate process whereby they could be bonded together in a gastight manner, a problem of no small difficulty in view of the manually stable characteristics of the selected material.

Referring now to the drawings, wherein like reference numerals designate identical or corresponding parts throughout the several views, and more particularly to FIG. 1 thereof, a short length of Kovar tubing is illustrated at 10. The illustrated tubing preferably is substantially 0.125 inch outer diameter, 0.095 inch inner diameter tubing; however, it should be understood that the particular size of the outer and inner diameter of the Kovar tubing can vary depending upon the type of equipment the leak structure is used with and the characteristics of the environment it is used in. In accordance with the method of the present invention, the tubing is preferably wet hydrogen fired to a temperature in the range of 900° to 1000° C for substantially thirty minutes to evenly oxidize it for sealing to a glass tube. The end of the tubing to be used for sealing to a glass tube is rounded, as illustrated by the reference numeral 12, preferably using 600 grit sandpaper to reduce strain in the sealing area.

In the preferred illustration, a standard length of substantially six millimeter outer diameter, four millimeter inner diameter borosilicate glass tubing having the properties mentioned above, and illustrated at 14 in FIG. 2 is drawn down to substantially 0.094 inch outer diameter, as shown at 16, and firecut according to conventional techniques. The drawn glass tubing is inserted into the rounded and oxidized end 12 of the Kovar tubing 10. The glass is sealed inside the Kovar tubing by heating with a hand torch, for example, in the range of 1115° C. The seal is formed by the heated glass adhering to the oxide formed on the metal and the resulting product is illustrated in FIG. 3. The flaired end 15 of glass tubing 14 is formed during the sealing process due to the natural flow of the heated glass.

After the product as illustrated in FIG. 3 is formed, the reduced diameter section 16 of the glass tubing, which has been sealed to the oxidized and rounded end 12 of Kovar tube 10 is slowly heated, with a hard torch soft flame for example, and drawn under a microscope 19 or other magnifying instrument to reduce the interior diameter to the desired leak size such as, for example, substantially two microns. When drawn as nearly as possible to the desired size, the leak is tested in an apparatus of the type illustrated in FIG. 6.

Referring to FIG. 6, the illustrated test apparatus, designated generally by the reference numeral 18, includes a helium supply 20, such as a conventional pressurized helium reservoir, coupled through an inlet line 22 including a control valve 24 and an exhaust valve 26 to a conventional high pressure oven 28. A conventional pressure range gauge 30 is coupled to the inlet line 22 near the position at which it enters the high pressure oven 28. The drawn leak assembly 17 is positioned within the high pressure oven 28, and provides the only coupling between inlet line 22 and an outlet line 32 which is coupled to a conventional helium leak detector 42. The outlet line includes an exhaust valve 36 and a coupling flange 38 cooperating with a similar flange 40 of the helium leak detector 42.

In operation, and again referring to FIG. 6, the leak structure to be tested is mounted within the high pressure oven 28 and initially heated to the temperature range of interest, such as 475° C for a probe to be used in the atmosphere of Venus, for example. The upstream side of the test system is raised to a pressure of substantially 1500 psi preferably using helium gas, and the leak rate is monitored by the helium leak detector 42. If a two micron internal diameter leak structure is being used it should provide a $1 \times 10^{-7}$ to $1 \times 10^{-5}$ cc/sec leak rate. Thus, by observing the output of the helium leak detector it is possible to determine whether or not the test leak is formed to the proper size. Testing procedures may also be extended to varying the pressure and temperature within the high pressure oven 28 to verify tightness of the seal between the Kovar tubing and the borosilicate glass member and to further test the leak diameter.

If desired, after testing the leak rate, the leak structure can be heated near the junction between the reduced diameter section 16 and the normal width tube 14, FIG. 3. After the glass tube is heated to a sufficient temperature to melt the glass, the excess glass is removed in the conventional manner resulting in a sealed plug 36 as shown in FIG. 4. The sealed plug 36 may again be subjected to testing in the apparatus 18 illustrated in FIG. 6 to verify under high pressure that no leak exists in the bond between the glass tube and the Kovar tube, although this testing step is not critical to the method of making the gas leak structure.

After the plug 36 is formed as described above, and the glass has cooled to normal temperature, the excess glass including the plug 36 is removed such as, for example, by scratching the surface of the inlet leak structure around the circumference of the reduced diameter section 16 and breaking the reduced diameter section 16 at the scratch, leaving a completed leak inlet 38, as shown in FIG. 5. The above procedure is preferred so that glass fines, such as produced by conventional cutting methods, will not become lodged within the small diameter leak opening. The completed leak inlet 38 is re-inserted into the apparatus shown in FIG. 6 and again tested to insure that the leak rate has not been changed by the plug forming and cutting steps described above. If the leak checks out to the desired rate substantially $1 \times 10^{-7}$ to $1 \times 10^{-5}$ cc/sec for the Venus probe), it is accepted as a suitable leak. Clearly, other desired leak rates can be achieved so that leaks of substantially any volume rate can be formed and tested according to the technique of the present invention.

As mentioned previously, the physical properties of Kovar and borosilicate glass are highly significant to the operation of the leak of the present invention under adverse environmental conditions. For Kovar, these specific physical properties include a melting point of substantially 1400° C, and thermal expansion of substantially 4.3 to 5.3 from substantially 30° C to 200° C at substantially $10^{-6}$ In/Ic/C°. For Corning 7056 borosilicate glass, the specific physical properties of interest are a softening point at substantially 720° C, and thermal expansion of substantially 51-57 from substantially zero to 300° C at substantially $10^{-7}$ In/In/C°.

It is noted that although Corning 7056 borosilicate glass is the recommended material, the following Corning Glass compositions can also be used: 7052, (65% $SiO_2$, 7% $Al_2O_3$, 18% $B_2O_3$, 1% $Li_2O$, 2% $Na_2O$, and 2%

$K_2O$) 1720, (62% $SiO_2$, 17% $Al_2O_3$, 5% 1% $Na_2O$, 7% Mg, and 8% Ca), 1723 57% $SiO_2$, 15% $Al_2O_3$, 5% $B_2O_3$, 7% Ca, and 6% $Na_2O$), 7740 (81% $SiO_2$, 2% $Al_2O_3$, 13% $B_2O_3$, and 4% $Na_2O$), and 7813 (96.5% $SiO_2$, 0.5% $Al_2O_3$, and 3% $B_2O3$). Furthermore, leaks could be drawn from other compositions of borrosilicate clear glass and silica.

It should be further noted that although Kovar tubing is preferred other metals such as, for example, molybdenum tubing, copper tubing, stainless steel tubing, and tungsten tubing may also be used. However, the proper glass must be used with each of the above metals to insure that their coefficient of expansions are substantially the same so that the seal between the metal tube and the glass does not break at high temperatures. Kovar tubing is preferred over the other metals because of its stable characteristics at high temperatures and the ease by which the seal between the borosilicate glass and Kovar tubing is formed. For example, should molybdenum be used, the step of sealing the glass to the molybdenum must be accomplished in an inert gas atmosphere.

Obviously, numerous additional modifications and variations of the present invention are possible in light of the above teachings. It is therefore to be understood that within the scope of the appended claims, the invention may be practiced otherwise than as specifically desired herein.

I claim:

1. A method of fabricating an inlet leak for a mass spectrometer comprising the steps of:
   wet hydrogen firing an internal segment of high melting point metal tubing at a temperature range from 900° C to 1000° C to oxidize said internal segment for sealing to a glass tubing;
   inserting a length of said glass tubing formed of a selected high melting point glass having a coefficient of expansion substantially the same as said metal tubing into said oxidized segment of said metal tubing, said glass tubing having an outer diameter substantially the same as the inner diameter of said metal tubing;
   heating said glass tubing in the region of said oxidized segment to a molten state for causing said molten glass to adhere to said oxidized segment of said metal tubing to form a seal therebetween and for flairing said inserted end of said glass tubing;
   heating said glass tubing extending from said metal tubing to a softened state;
   drawing said softened glass tubing to reduce the interior diameter thereof to a fine leak apperature; and
   breaking away an end portion of said drawn glass tubing to complete said inlet leak.

2. A method as in claim 1 further comprising the step of:
   testing the leak rate of said inlet leak subsequent to said step of drawing.

3. A method as in claim 2 further comprising the step of:
   removing excess glass tubing to from said leak inlet by heating said drawn glass tubing subsequent to said step of testing.

4. A method as in claim 3, wherein said step of removing includes the step of:
   sealing said drawn glass tube structure.

5. A method as in claim 1 wherein said step of wet hydrogen firing is carried out for approximately thirty minutes.

6. A method as in claim 1 wherein said step of
   heating said glass tubing in the region of said oxidized segment is performed at a temperature about 1115° C.

7. A method as in claim 1, further comprising the step of:
   measuring the leak rate of said inlet leak after said step of breaking.

8. A method as in claim 1 wherein said glass tubing consists substantially of 65%–70% $SiO_2$, 3%–7% $Al_2O_3$, 17%–18%, $B_2O_3$, 1% $Li_2O$, 1%–2% $Na_2O$, and 2%–8% $K_2O$.

9. A method as in claim 1 wherein said glass tubing consists substantially of 70% $SiO_2$, 3% $Al_2O_3$, 17% $B_2O_3$, 1% $Li_2O$, 1% $Na_2O$, and 8% $K_2O$.

10. A method as in claim 1 wherein said metal tubing consists substantially of 54% Fe, 29% Ni, and 17% Co.

11. A method as in claim 1 wherein said step of heating said glass tubing extending from said metal tubing is performed at a temperature of about 720° C.

12. A method as in claim 1 wherein said step of drawing is performed under magnification.

13. A method as in claim 12 wherein said fine leak apperature is substantially two microns in diameter.

14. A method as in claim 12 wherein said magnifying means is a microscope.

* * * * *